US006885386B2

(12) United States Patent
Weinbrenner (10) Patent No.: US 6,885,386 B2
(45) Date of Patent: Apr. 26, 2005

(54) ANIMATED DISPLAY WITH MOTOR DRIVEN FILM OR MOTOR DRIVEN MASK POSITIONING WITH AUTOMATIC RASTER ALIGNMENT AND OPERATIONAL MODE CODING IN IMAGE

(76) Inventor: Richard L. Weinbrenner, 2228 SW. Gull Harbor La., Palm City, FL (US) 34990

( * ) Notice: Subject to any disclaimer, the term of this patent is extended or adjusted under 35 U.S.C. 154(b) by 0 days.

(21) Appl. No.: 10/684,987

(22) Filed: Oct. 14, 2003

(65) Prior Publication Data

US 2004/0136080 A1 Jul. 15, 2004

Related U.S. Application Data

(60) Provisional application No. 60/417,798, filed on Oct. 11, 2002.

(51) Int. Cl.[7] .............................. G09G 5/10; G09G 5/02; G09G 3/00; G09G 3/04
(52) U.S. Cl. .......................... 345/690; 345/32; 345/33; 345/36; 345/43; 345/697
(58) Field of Search ........................ 345/30–36, 43–45, 345/204, 690–691, 694, 697; 362/84, 103–108, 118, 806–811

(56) References Cited

U.S. PATENT DOCUMENTS

| 4,118,879 A |   | 10/1978 | Simon |
|---|---|---|---|
| 4,875,144 A | * | 10/1989 | Wainwright ................. 362/103 |
| 4,970,815 A | * | 11/1990 | Sunderland .................. 40/546 |
| 6,384,980 B1 |   | 5/2002 | McKinley |
| 6,443,590 B1 | * | 9/2002 | Lovitt ......................... 362/103 |

* cited by examiner

Primary Examiner—Vijay Shankar
(74) Attorney, Agent, or Firm—Jeffrey Calfa (57) ABSTRACT

The invention provides an animated display in which an illumination source projects light through a platen and a transparency that contains alternative translucent images. The invention involves using an electronic processor to drive two highly controllable motors. Light sensors are used to determine the alignment of a mask over said transparency relative to the light source. The sensors provide input to the processor to allow the two motors to align the mask horizontally. The motors are used to drive the mask vertically in order to change the projected image. In a second embodiment, the lens is a lenticular lens behind the translucent raster multiple image film. A motor acts to drive the mask to align the opaque or image portions of the raster to the focusing portion of the lenticular lens. A lenticular lens may focus on the image line for one of the images on the film.

9 Claims, 9 Drawing Sheets

O PTO SENSORS

FIG. 8

SENSOR MOUNTING & ELECTRICAL CIRCUIT

ANIMATED DISPLAY WITH MOTOR DRIVEN FILM OR MOTOR DRIVEN MASK POSITIONING WITH AUTOMATIC RASTER ALIGNMENT AND OPERATIONAL MODE CODING IN IMAGE

This is a non-provisional patent application claiming the priority of provisional patent application Ser. No. 60/417,798, filed Oct. 11, 2002.

BACKGROUND OF THE INVENTION

This invention relates to an animated display device having illumination for projecting light to pass through a lens and a mask. The mask has sections of transparent and opaque character. In this invention such a mask is moved using motors such as linear actuator step motors using a microstep drive for quiet operation. Multiple images are printed on a translucent film in an interleaved line format. The control of the motor allows movement quickly or slow transitions between images by positioning the transparent opening in the mask over the line of the picture to show through.

If there are three pictures on the translucent film image, a first line of image #1 is present, then right above first line of image #2, then the first line of image #3, which is followed by the second line of image #1, etc. The mask permits the lines from one image at a time to show through.

SUMMARY

The invention provides an animated display in which an illumination source projects light through a platen and an image transparency that contains alternative translucent images. The invention involves using an electronic processor to drive two highly controllable motors. Light sensors are used to determine the alignment of a mask over said transparency relative to the light source. The mask has opaque and transparent areas. The sensors provide input to the processor to allow the two motors to align the mask horizontally. The motors are used to drive the mask vertically in order to change the projected image.

In a second embodiment, the lens is a lenticular lens behind the translucent raster multiple image film. A motor acts to drive the raster film to align the opaque or image portions of the raster to the focusing portion of the lenticular lens. A lenticular lens is described in U.S. Pat. No. 6,384,980. A lenticular lens may focus on the image line for one of the images on the film.

DETAILED DESCRIPTION

The invention is an animated display in which an illumination source projects diffuse light through a lens and a mask that contains alternative translucent images and opaque areas. An optical sensor is provided at the left side of the mask and the right side of the mask. Two motors, one at the left and one at the right permit horizontal alignment of the mask to the horizontal alignment of the translucent picture. These motor axis of movement are preferably in-line with the sensor vertical axis.

Figure 1:
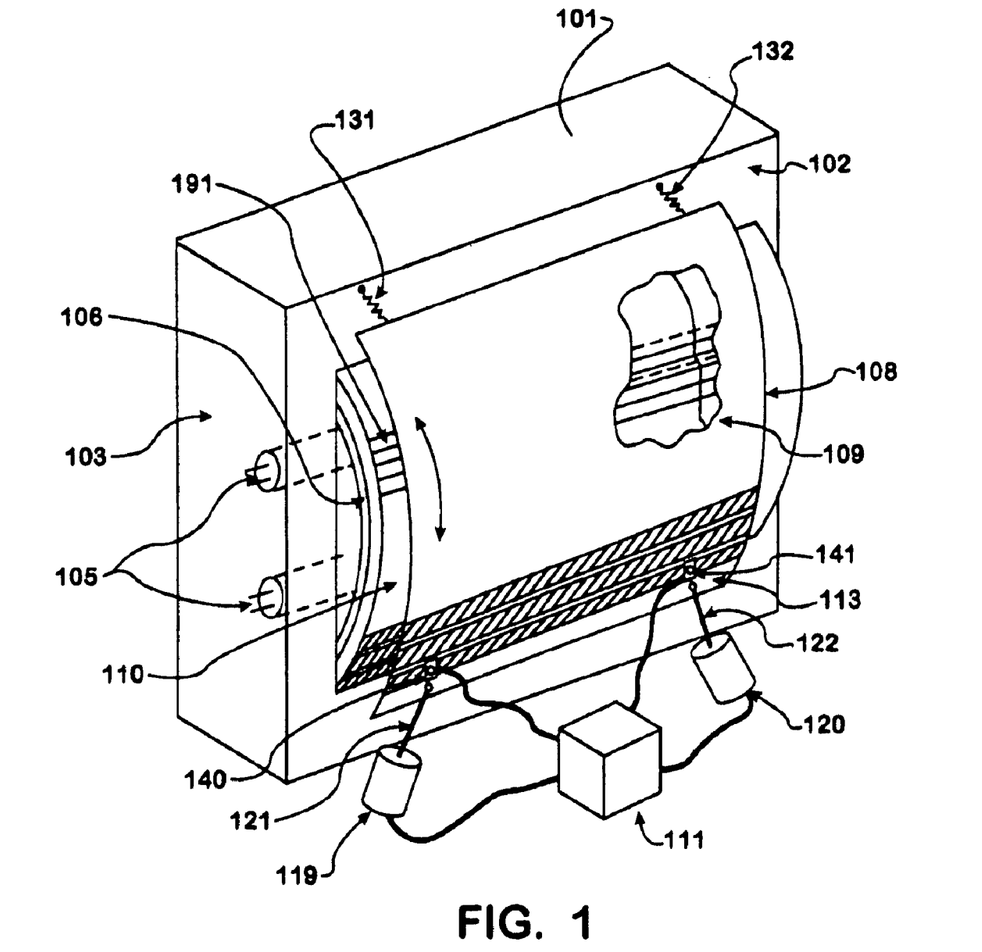
FIG. 1 is a perspective view of an embodiment of the invention with a cutaway portion to show the light sources.
Figure 7:
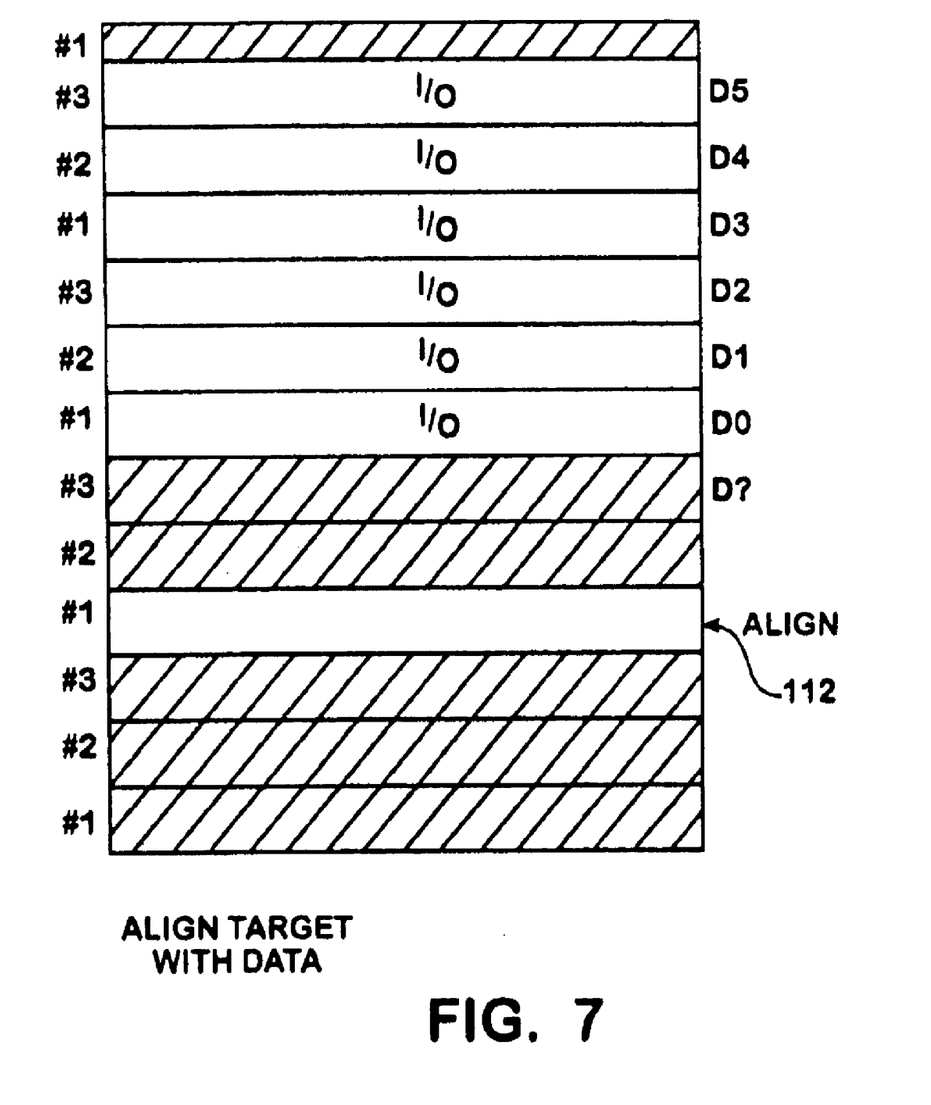
FIG. 7 shows the data coded lines in an interleved image.

FIG. 1 shows a first embodiment of the invention. There is an animated display 101 with a frame 103. There is a curved rigid platen or lens 106 mounted on the frame 103. The platen 106 is clear and may be made in of a plastic such as lexan. There is an image transparency or film 110 engage to a front face of the platen 106. There is a mask that moves over the image film 110 and this mask 108 has alternatively opaque sections 108 and transparent sections 107. The image film or transparency 110 has interleaved images 191 in lines. The frame 103 contains a light source 105 which may be an LED or other luminescent device 105. The cutaway portion 109 is for demonstration to show the relative position of the light source 105 behind the lens 106. The transparent areas of the mask 108 limit the images 191 for projection to one of the multiple interleaved images 191. The mask 108 is held against the platen 106 through tensioning devices 131 and 132 that tend to pull the mask 108 upwards and towards the lens 106. The embodiment shown involves using an electronic processor 111 to drive two highly controllable motors 119 and 120. The motors 119 and 120 are engaged to the mask 108 through actuating arms 121 and 122. Light sensors are used to determine the alignment of the mask relative to the image and alignment target area 112 as shown in FIG. 7. In the embodiment shown in FIG. 1, the light sensors 140 and 141 are mounted to the exterior of the mask 108 to sense light transmitted through the mask 108. As will be discussed and shown in the embodiment in FIG. 2, sensors 150 and 151 may alternatively be mounted to sense reflective light that reflects off of the image target 112. The sensors provide input to the processor 111 to allow the two motors 119 and 120 to align the mask 108 horizontally and vertically thereby assuring alignment of the mask 108 to the image on the transparency 110. After alignment, the motors 119 and 120 are used to drive the mask 108 vertically in increments of the image line pitch distance in order to change the projected display image by image.

The motors 119 and 120 maybe dc motors, step motors, linear motors, or other motors allowing fine independent controlled movement. The may be mechanically coupled by means of a lead screw, cam, or other mechanical linkage to achieve vertical motion. An electronic controller 111 can perform this alignment by using a sensor 140 or 150 on the left and a sensor 150 or 151 on the right when the image is printed with an alignment feature printed on one or more of the interleaved images.

Figure 2:
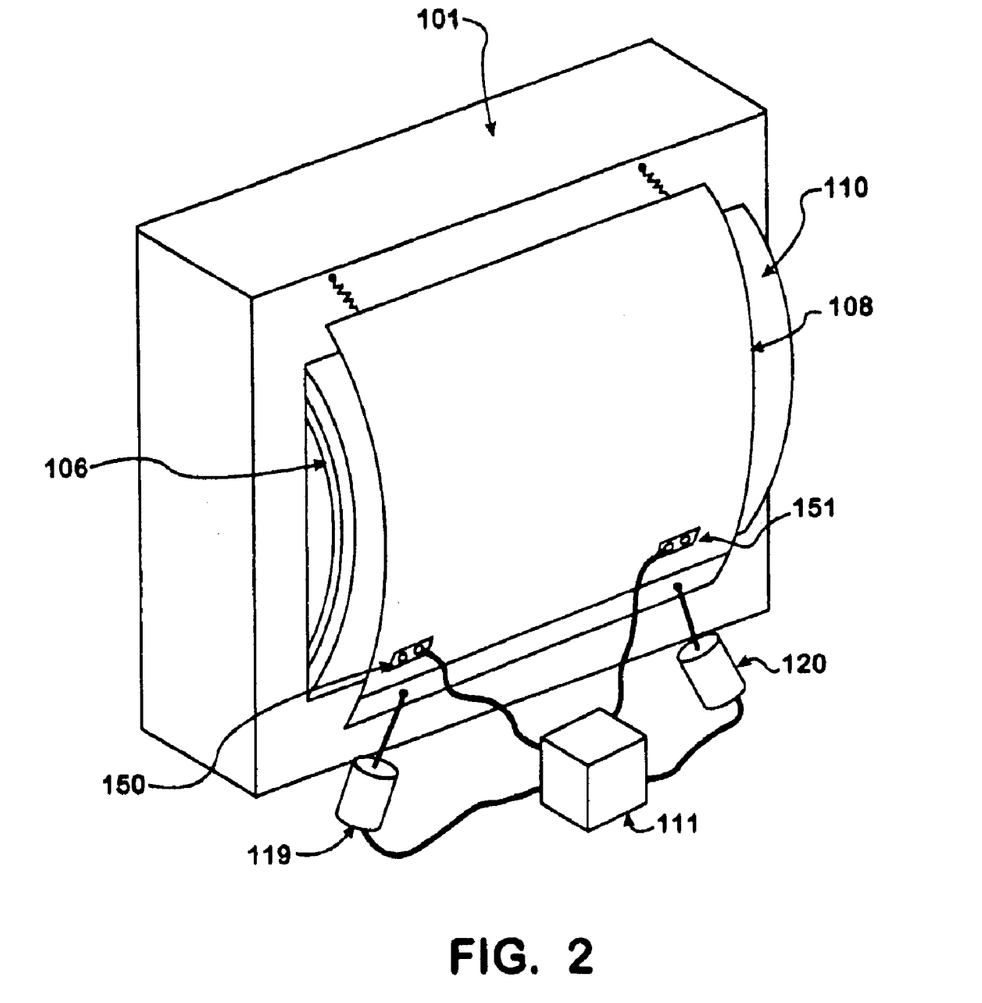
FIG. 2 is a perspective view of a second embodiment of the invention.

The image and mask 130 are back-lit front lit in the case of the reflective verson. As shown in the embodiment of FIG. 2, a phototransistor or other light sensor 150 and 151 are placed such that they can sense light that shines through the mask and image or reflects off the mask and image.

Figure 8:
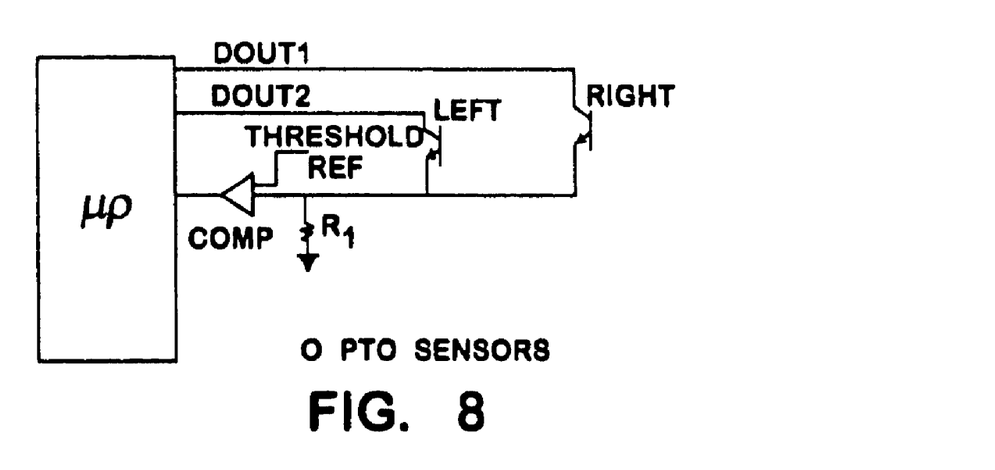
FIG. 8 shows a portion of the control circuit for FIGS. 1 and 2 including the photo-sensors.

These reflective light sensors 150 and 151 have both a light emitting portion and a light sensing portion. Image #1 has a feature imprinted in the lower left and the lower right (could be elsewhere on either side). This feature may be as simple as a transparent rectangle or aperture with blocking or non-reflective areas surrounding it. A negative image could be used just as well, thereby reversing the sensor logic output. Picture #2 and Picture #3 would have only a totally black feature in this area as shown in FIGS. 7 and 8.

Initially the motors may align to a 'home or datum' position by drawing the mask downward until a mechanical stop or home sensor is encountered and resets its position to zero. Then, the motor releases the mask upward until it aligns with picture #1 which is the clear or reflective area depicted in FIGS. 7 and 8. The controller 111 records this position, independently upon the occurrence for the left and the right sensors 141 and 140. The controller continues to release the mask in the upward direction and encounters the transition from light to dark as the upper edge of the target and these positions for the left and right sensors are recorded. The averaged position for the two transitions on the left and on the right are defined as the image #1 position. Image #2 and image #3 are a distance function of the pitch of the image lines, a parameter that is standard and defined for an embodiment of this system. In this manner picture #1 may be aligned. As this is done potentially independently on the right and left sides, horizontal alignment is achieved between the mask and the picture lines, even if the device has manufacturing imperfections or placement of the image or the mask.

The align process may perform the above described sequence, followed by moving past the upper transition of the target and then repeat the process in reverse. This yields additional data regarding the position of image number 1 but as approached from the direction moving the mask downward. In a case where the manufactured units have either mechanical lost motion or electrical sensor hysteresis, this can improve the performance of the image #1 position location for each direction of approach.

This animated back-lit display may be fitted with an image of 2, 3, 4 or more pictures. Also, the picture sequence may display in a manner such that each image is displayed for a period of time, then an almost instant step to the next picture is executed, and the next image is displayed.

Sometimes the multiple images are morphed from one to the next. Sometimes the multiple images are stop motion images which when moved from one to the next produce an animation sequence, which may repeat from a first to last to first . . . image or from a first-last-first . . . sequence.

Information about the required or desired pattern of movement, or the program defined to control the image may be coded into the transparent photo. Moving the motor actuator such that the mask moves in from of the image can code a binary pattern and that binary pattern can direct that the desired sequence be run. The binary pattern can be read by a microprocessor in the control circuit via the phototransistors. This pattern can be defined and therefore interpreted as a desired sequence for the image. This permits the individual who composes the image to embed not only the alignment target but also the preferred display sequence program into the image. There are many schemes and protocols known within the field of computing which can encode such data, and the example depicts a simple scheme where each line represents successive bits.

In a second embodiment, the lens is a lenticular lens behind the translucent raster multiple image film. A lenticular lens is described in U.S. Pat. No. 6,384,980. However in that patent the lens is in front of the image and functionally replaces the mask layer in the depictions presented in this patent. This lenticular lens is placed between the platen and the light source, or replaces the platen and serves the purpose of utilizing a larger percentage of the light, focusing it through the transparent slit of the mask so that light that otherwise would have been absorbed may focus on the image line for one of the images on the film. This increases the brightness of the image with a given back light or alternatively permits use of lower power energy saving illumination. Additionally, this increase in light efficiency can make a greater number of images feasible, since as more images are added the mask slit gets to be smaller and smaller, and in the previously described systems a lower percentage of the back lighting is passed through the image.

Figure 3:
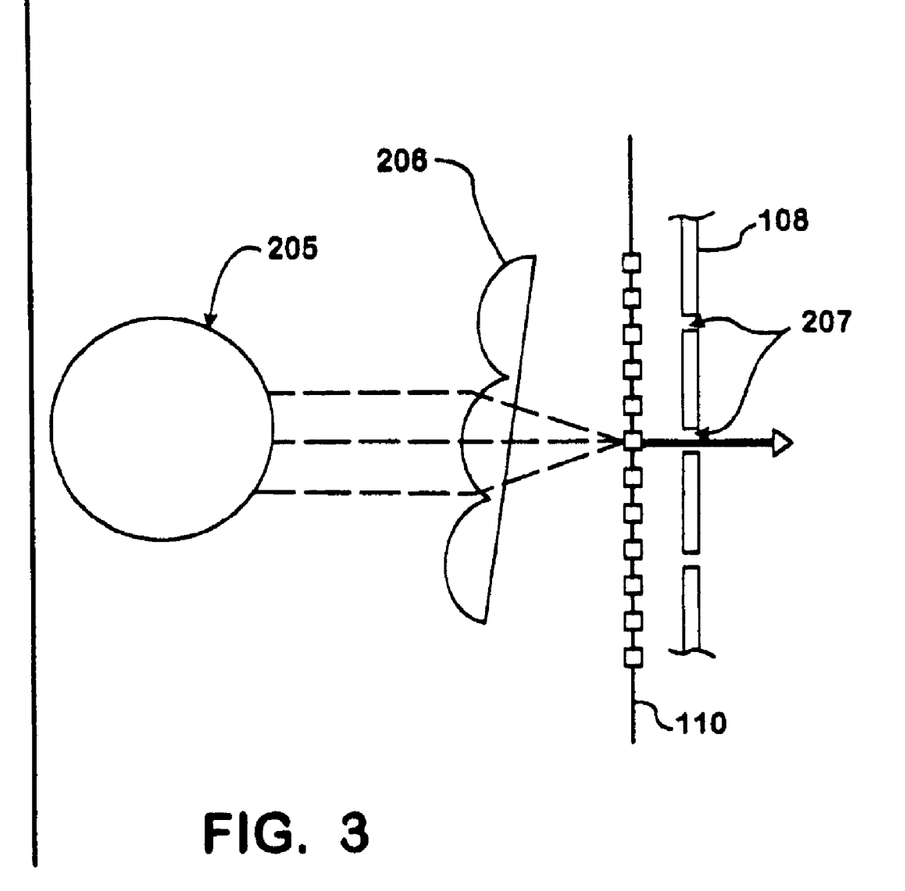
FIG. 3 is a side view of a third embodiment of the invention using a lenticular lens.
Figure 10:
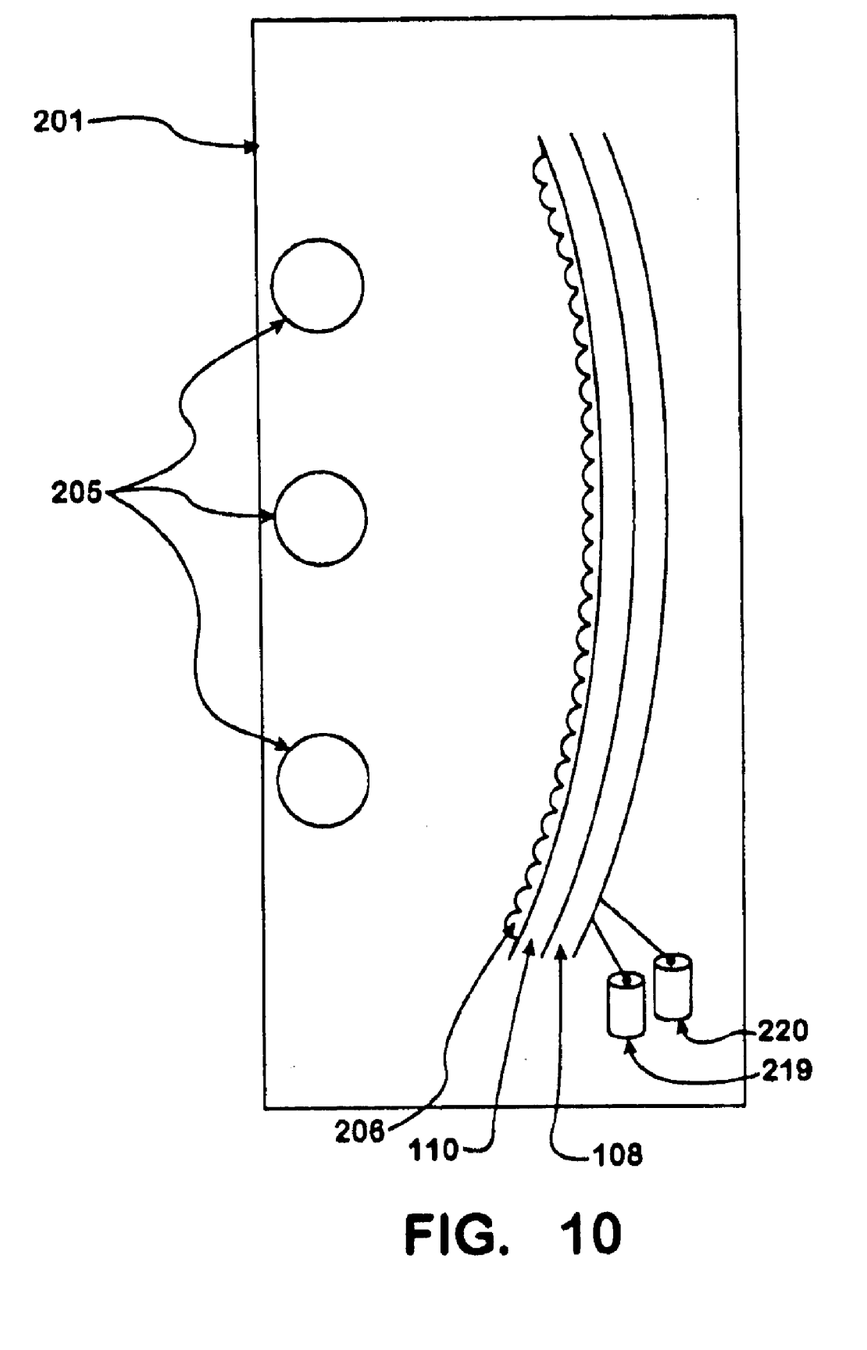
FIG. 10 is a blow up schematic side view of the lenticular lens backlighting efficiency improvement structure.

The embodiment shown in FIGS. 3 and 10 feature a lenticular lens 206 placed between a light source 205, and the image transparency 110 and the front mask layer 108. FIG. 3 is a blown up portion of FIG. 10. The lenticular lens 206 is comprised on one side of a contiguous array of cylindrical lenses known as lenticules and the other side being flat. In this embodiment, the lenticular lens 206 is aligned with the openings 207 in the mask layer 108 such that most of the light that impacts the rear of the lenticular lens 206 is focused into a line that illuminates just the current image line. The pitch of the lenticular lens 206 must match the pitch of the images raster and the mask openings. Using this technique, lower power lamps 205 can be used for backlighting, or alternatively a higher level of illumination may be achieved. The mask layer 108 is controlled by left and right motors 219 and 220 and these may be controlled by a controller 111 such as the embodiments shown in FIGS. 1 and 2.

A large sign can produce substantial heat, which has negative effects from contributing to air conditioning (A/C) loading to expanding the translucent image film, and mask materials that can contribute to degraded image alignment.

Figure 4:
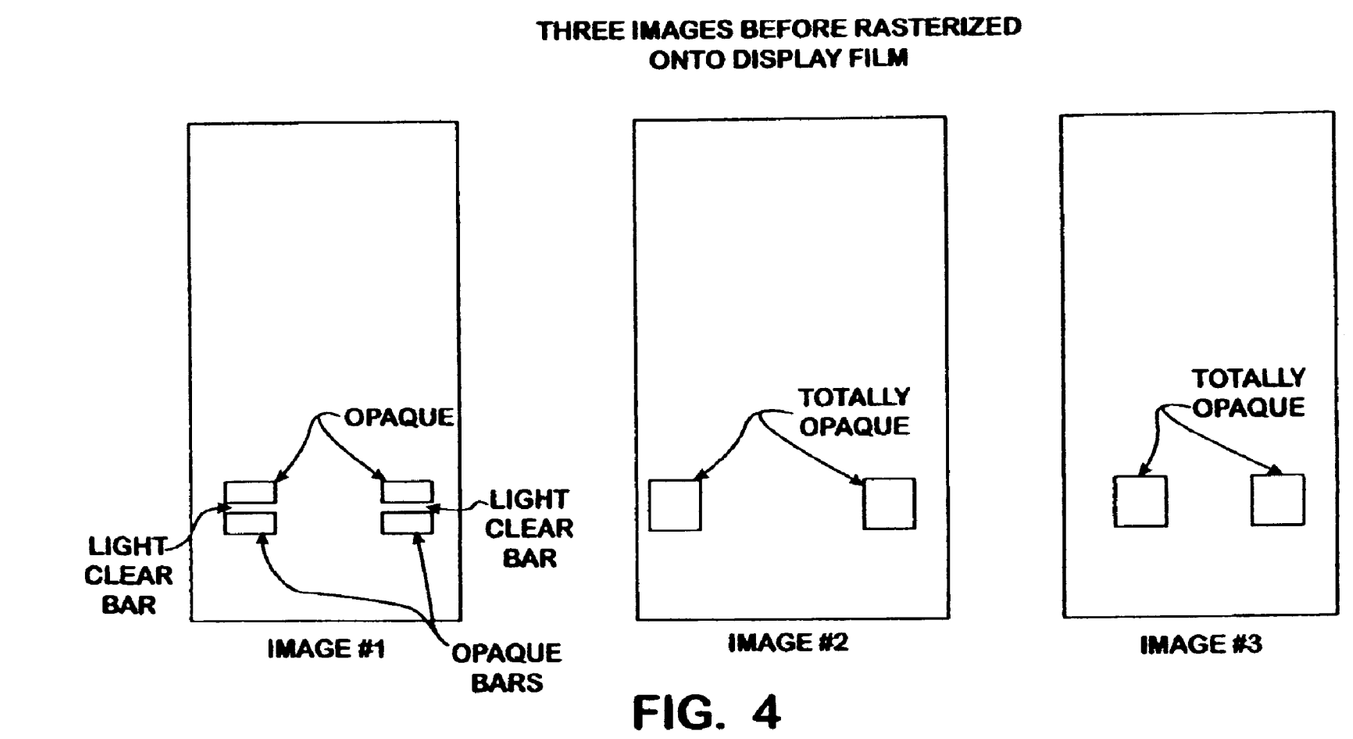
FIG. 4 shows three views of the transparency to demonstrate alignment of a transparency using an embodiment of the invention.

FIG. 4 shows a transparency containing 3 images to be created. Those three images are depicted. An opaque block is printed onto each of the three original images in predefined locations relative to the bottom edge of the picture, and the proscribed distance from the edges. This location will vary by picture size format. The image on #2 and #3 image is a totally opaque block. Image #1 has a transparent line such that when aligned with the mask, light will shine through and be picked up by the photo detector. Note the pattern is placed on the left and right sides so that independent alignment can not only compensate for locating image #1 but also performs compensation for any horizontal misalignment.

Figure 5:
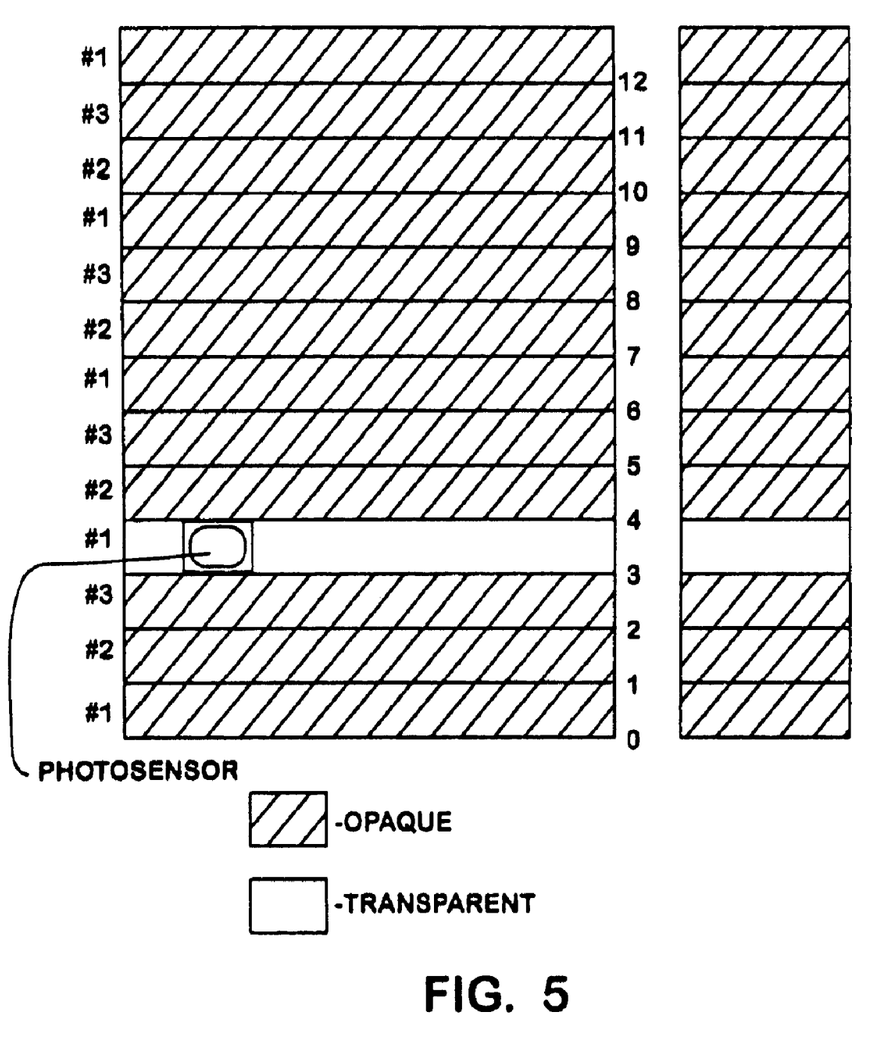
FIG. 5 is a detail showing an alignment of a target on a mask or transparency.

FIG. 5 is a detail of the align target image once the three images in FIG. 1 are combined in interleaved fashion. Note that the only clear space is the single line which existed in image #1. An outline of the photosensor aperture is depicted. As the mask is moved up the clear bar is diminished until the photosensor output diminishes below a defined threshold. Similarly when the mask is moved downward. An analog peak could be detected or a fixed threshold can be defined and that same threshold will be encountered on the downward or upward movement. The motor position will be saved when the threshold edges are encountered. The mid point of the position between the two edges is the center aligned position for image #1. The pitch is defined in distance terms as a parameter of the manufactured unit. The logic can be reversed, and all opaque can be clear and all clear can be opaque. Then the photosensor would look for the opposite transitions.

Figure 6:
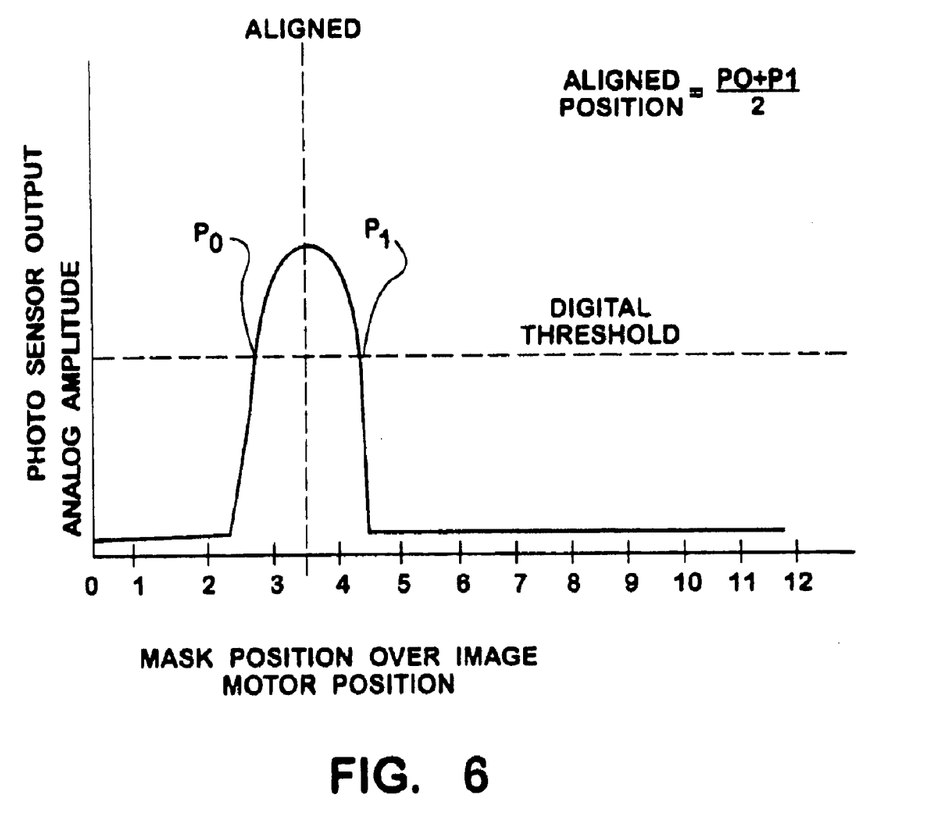
FIG. 6 shows a graph of position versus photo-sensor output.

FIG. 6 shows a graph of position verses photosensor output. Two mechanisms may be used to find the center aligned point for image #1. One would be to use the analog output of the sensor to find the maximum output. Alternatively, a fixed threshold can be used, and as the motor moves across the align target, it can record the positions P0 and P1. Then the center point is (P0+P1)/2.

FIG. 7 shows an expansion of the concept. Still the align feature is present. It must be ensured that we approach the target from below and that the first clear bar of the target is image #1 align target. Then, subsequent bars may be present on image #1, or all the images such that the photo sensor is exposed to illumination or no illumination and that these two conditions can be decoded as 1 and zero bits. If 4 bits can be recovered, then up to 16 modes may be specified by printing essentially a code into the image. The program sequence is embedded into the image itself.

FIG. 8 shows one embodiment of a photo-sensor threshold circuit. A comparator COMP compares the left and right sensor signal with a threshold value to determine transitions resulting from passing the target under the photo sensor, can provide a digital signal to the microprocessor.

Figure 9:
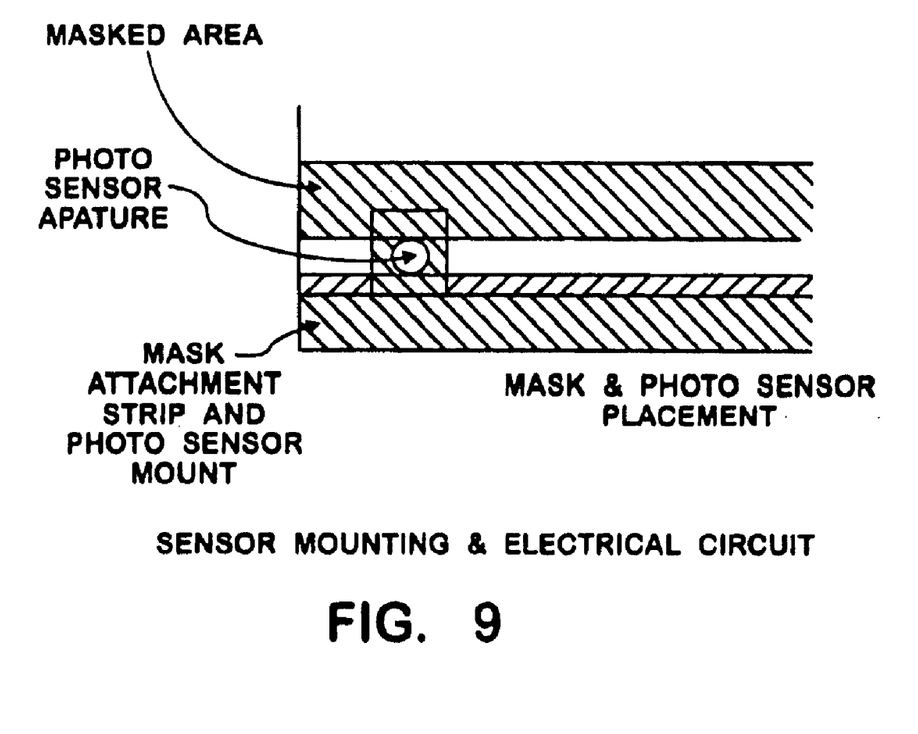
FIG. 9 is a blow up of the sensor mounting of FIG. 1 or 2.

FIG. 9 shows the photo-sensor mounting to the mask. The mounting allows the sensor to make horizontal level determinations. The sensor position allows for a servo method of seeking aligned position. The motor positioners may drive either the mask or the picture from an initially retracted position to the end of a range or until the line of both sides of the picture have been found, both the leading (LE) and falling (FE) edge. The average positions of the leading and falling edges are mathematically obtained and this average (LE+FE)/2 is the center of the aligned position for that sensor.

From a position past a falling edge of the alignment marks where the motion is reversed and the new leading and falling edge of the alignment marks are recorded. This approach is averaged as the above however by measuring from both directions imperfections of mechanical mechanisms and hysteresis effects of the sensor can be minimized.

Larger animated displays may have a difference in pitch since the mask and the film are stretched over a curved platen for the purpose of keeping the film and mask in contact. Since the mask is on a radius greater than the radius of the platen caused by the thickness of the image layer, some misalignment may result in the middle and top of the image. Also, there may be some unequal minor expansion of either the film or the mask, and this can make the sign appear poorly aligned when viewed, even though the alignment is correct at the sensor position, which is generally at the bottom or top of the sign (although it can be anywhere). The program in the microprocessor in this invention also provides for a positional bias offset position that allows the modified aligned position to make the sign or animated display appear more aligned at the center of the image.

As described above, the embodiments of the animated display with motor positioners and photo-sensors provides a number of advantages, some of which have been described above and others of which are inherent in the invention. Also modifications may be proposed to the animated display with motor positioners and photo-sensors without departing from the teachings herein.

I claim:

1. An illuminated animated display, comprising:
a housing;
a light source within said housing;
a platen at least partially clear in front of said light source within said housing;
said platen having a projection face opposite said light source, said projection face having a transparency film with interleaved images engaged;
a flexible mask having opaque and transparent sections, said flexible mask held in vicinity of said platen over said film;
two independently operable motors, one engaged one side of said flexible mask one engaged on an opposite side of said flexible mask, said motors horizontally aligning said transparent sections on said mask over image sections of said film on said platen to allow light from said light source to project said images;
said two motors for vertically repositioning said mask to allow changing of projection images; and
two light sensors, one engaged to one side of said mask and one engaged to an opposite side of said mask, said light sensors for providing alignment feedback information for automatic control of said two motors.

2. The animated display of claim 1, wherein:
said two independently operable motors controlled by an electronic controller; and
said light sensors engaged to provide feedback to said electronic controller.

3. The animated display of claim 2 wherein:
said light sensors are engaged to an outward facing side portions of said mask in vertical alignment with said motors.

4. The animated display of claim 3, wherein:
said electronic controller programmed to detect and store lower location of said translucent image position by moving said mask up until a clear bar is diminished indicating said light source output diminishes below a defined threshold, and said electronic controller programmed to detect and store upper location of said mask image by moving said mask downwards until a clear bar is diminished indicating said light source output diminishes below a threshold, said controller using said stored image positions to align specific images according to projection programs.

5. An illuminated animated display, comprising:
a housing;
a light source within said housing;
a platen at least partially clear in front of said light source within said housing;
said platen having a projection face opposite said light source, said projection face having a transparency film with interleaved images engaged;
a flexible mask having opaque and transparent sections, said flexible mask held in vicinity of said platen over said film;
two independently operable motors, one engaged one side of said flexible mask one engaged on an opposite side of said flexible mask, said motors horizontally aligning said transparent sections on said mask over image sections of said film on said platen to allow light from said light source to project said images;
said two motors for vertically repositioning said mask to allow changing of projection images; and
two light sensors, one engaged to one side of said mask and one engaged an opposite side of said mask, said light sensors for providing alignment feedback information for automatic control of said two independently operable motors, said light sensors having a light transmitting element and said sensors also for measuring light reflected back from opaque portions of said mask.

6. The animated display of claim 5, wherein:

said two independently operable motors controlled by an electronic controller; and said light sensors engaged to provide feedback to said electronic controller.

7. The animated display of claim 6, wherein:

said electronic controller programmed to detect and store lower location of said translucent image position by moving said mask up until a clear bar is diminished indicating said light source output diminishes below a defined threshold, and said electronic controller programmed to detect and store upper location of said mask image by moving said mask downwards until a clear bar is diminished indicating said light source output diminishes below a threshold, said controller using said stored image positions to align specific images according to projection programs.

8. An illuminated animated display, comprising:

a housing;

a light source within said housing;

a lenticular lens in front of said light source with said housing;

said lenticular lens having a projection face opposite said light source, said lenticular lens having individual lenticule portions for projecting light in a line;

an image transparency having translucent images in front of said lenticular lens;

a flexible mask held in vicinity of said lenticular lens over said image transparency, said mask having opaque and transparent areas; and a positioner for aligning said transparent areas of said mask over said translucent images on said image transparency to allow light from said light source to project said translucent images.

9. The animated display of claim 8, wherein:

said positioner for aligning said transparent areas of said mask over said translucent images on said image transparency comprised of two independently operable motors, one engaged one side of said flexible mask one engaged on an opposite side of said flexible mask, said motors horizontally aligning said transparent areas of said mask over said translucent images on said transparency to allow light from said light source to project said translucent images;

said two motors for vertically repositioning said mask to allow changing of projection images.

* * * * *